US012811293B2

(12) United States Patent
Ohshige

(10) Patent No.: US 12,811,293 B2
(45) Date of Patent: Nov. 24, 2026

(54) ANTENNA APPARATUS

(71) Applicant: CANON KABUSHIKI KAISHA, Tokyo (JP)

(72) Inventor: Reiya Ohshige, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/244,504

(22) Filed: Jun. 20, 2025

(65) Prior Publication Data

US 2025/0392045 A1 Dec. 25, 2025

(30) Foreign Application Priority Data

Jun. 21, 2024 (JP) ................................ 2024-100872

(51) Int. Cl.
*H01Q 5/25* (2015.01)
*H01Q 9/40* (2006.01)

(52) U.S. Cl.
CPC ................ *H01Q 5/25* (2015.01); *H01Q 9/40* (2013.01)

(58) Field of Classification Search
CPC ............... H01Q 5/25; H01Q 9/30; H01Q 9/40
See application file for complete search history.

(56) References Cited

U.S. PATENT DOCUMENTS 7,375,700 B2 * 5/2008 Hwang ................ H01Q 9/0485
343/702

FOREIGN PATENT DOCUMENTS

| | | |
|---|---|---|
| JP | 2009081590 A | 4/2009 |
| JP | 2012129598 A | 7/2012 |

* cited by examiner

*Primary Examiner* — Daniel Munoz
(74) *Attorney, Agent, or Firm* — Canon U.S.A., Inc. IP Division

(57) ABSTRACT

An antenna includes a first radiation element, a second radiation element, a ground, and a power feed unit. The first radiation element is in a planar shape and includes a first contact point and a second contact point that are in contact with the second radiation element. The second radiation element branches from the power feed unit and has a first region that is from the first contact point to the power feed unit, and a second region that is from the power feed unit to the second contact point.

11 Claims, 5 Drawing Sheets

ANTENNA APPARATUS

BACKGROUND

Field

The present disclosure relates to an antenna apparatus, in particular, an antenna apparatus for ultra-wideband communication using Ultra-Wideband or the like.

Description of the Related Art

In recent years, there has been growing interest in communication systems that are intended for use in high-capacity data communication, high-speed communication, location information tracking, security measures, and the like using a technique so-called Ultra-Wideband (UWB) which utilizes a very wide bandwidth. Consequently, an antenna capable of covering an ultra-wideband is also required. Antennas operate mainly by resonance, and because the resonance structure of an antenna mainly depends on the wavelength, the antenna size is inevitably increased to cover a wide frequency band.

Antennas discussed in Japanese Patent Application Laid-Open Nos. 2009-81590 and 2012-129598, for example, are conventionally known as ultra-wideband antennas for use in UWB. Japanese Patent Application Laid-Open No. 2009-81590 discusses an ultra-wideband antenna apparatus that covers frequency bands for use in UWB and mobile phone communication. The antenna includes a folded plate-like monopole antenna part having an angular U-shaped cross section and two conductor elements extended from two parts of the folded plate-like monopole antenna. Japanese Patent Application Laid-Open No. 2012-129598 discusses a configuration having characteristics of a plate antenna and a loop antenna which are switched by a switch, and cover a wide frequency band from 0.85 gigahertz (GHz) to 6 GHz. The configuration includes an external circuit with a three-dimensional structure, the switch, and the like. Therefore, there are issues that the antenna apparatus is complicated and large, and the degree of freedom in design is low.

SUMMARY

The present disclosure is directed to providing an antenna capable of covering an ultra-wideband antenna with a simple, compact, and high degree of design freedom by a configuration in which two radiation elements are combined on a plane.

An aspect of the present disclosure provides an antenna configured to operate between a first frequency and a second frequency, the antenna includes a first radiation element, a second radiation element, a ground, and a power feed unit, wherein the ground is disposed at least on a same plane as the first radiation element, wherein the first radiation element is a planar shape conductor including a first contact point and a second contact point that are in contact with the second radiation element, wherein the second radiation element is a linear shape conductor branching from the power feed unit with a first region extending from the first contact point to the power feed unit, and a second region extending from the power feed unit to the second contact point, wherein the first region and the second region are each shorter than a quarter wavelength of the first frequency, and wherein a separation distance between the ground and the first radiation element in the same plane is shorter than the quarter wavelength of the first frequency.

Further features of the present disclosure will become apparent from the following description of exemplary embodiments with reference to the attached drawings.

DESCRIPTION OF THE EMBODIMENTS

Hereinafter, exemplary embodiments according to the present disclosure will be described with reference to the drawings. The configurations described in the following exemplary embodiments are merely examples, and the present disclosure is not limited to the illustrated configurations.

Figure 1A:
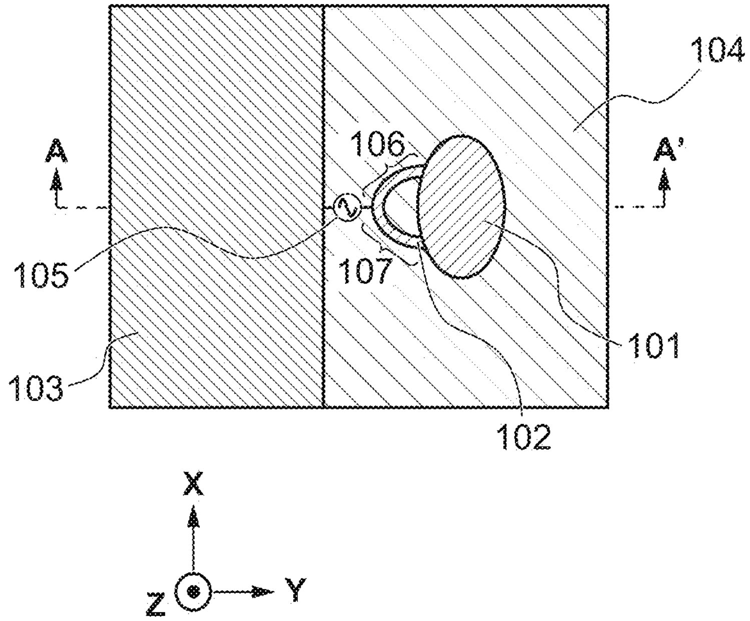
FIGS. 1A and 1B are diagrams illustrating an example of an overall configuration of an antenna according to a first exemplary embodiment.
Figure 1B:
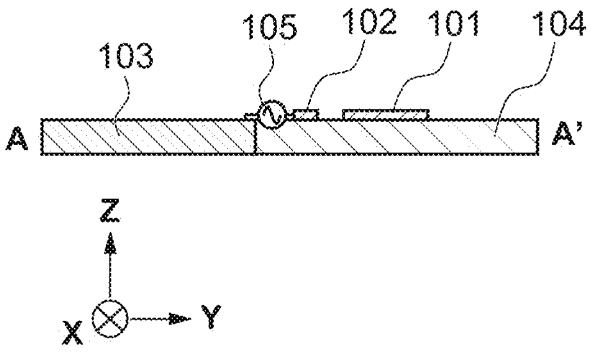
Figures 2A, 2B, 2C, 2D:
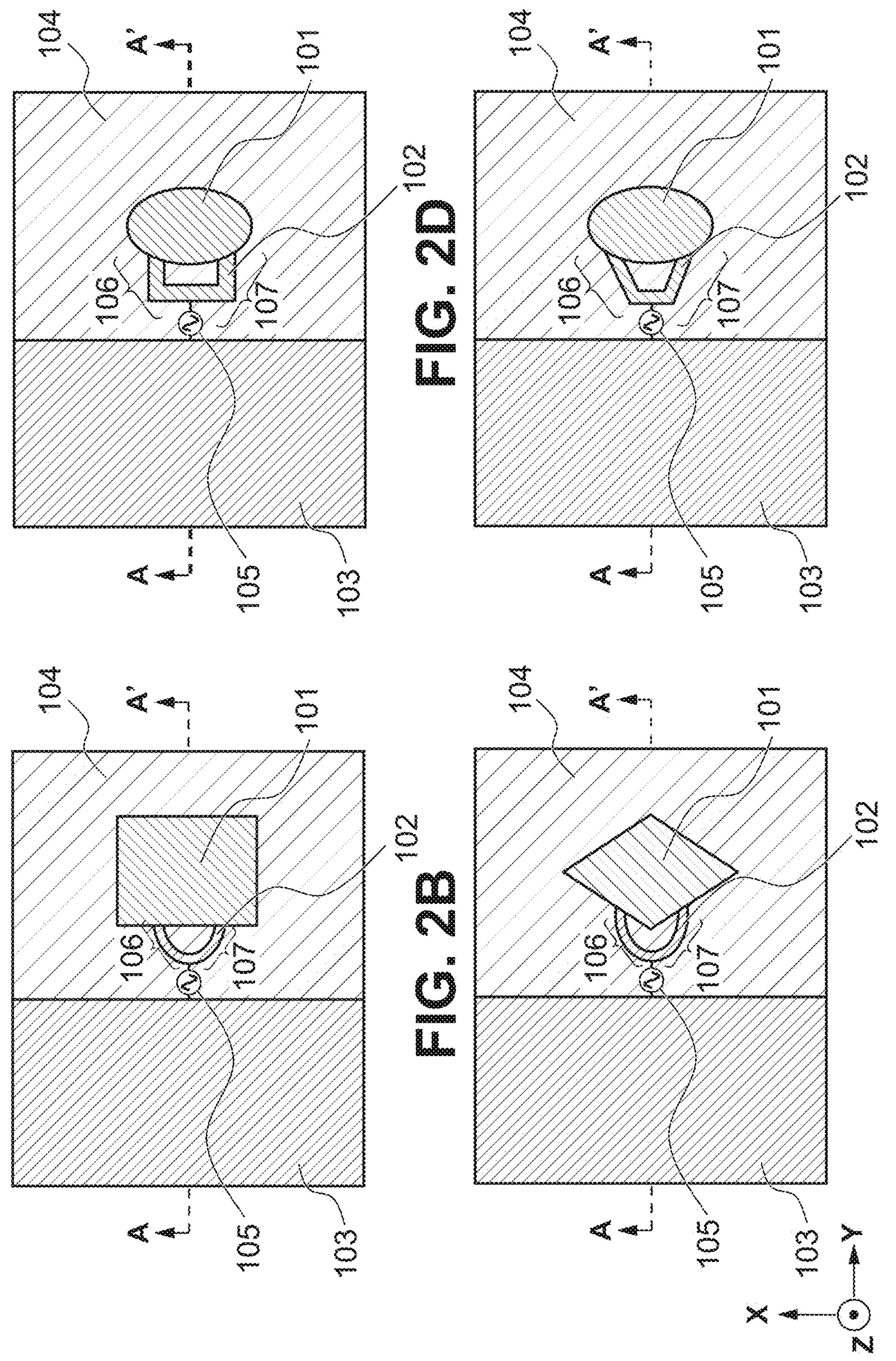
FIGS. 2A to 2D are diagrams illustrating shape variation examples of radiation elements of an antenna according to the first exemplary embodiment.

FIGS. 1A and 1B are diagrams illustrating an overall configuration of an antenna according to a first exemplary embodiment. FIG. 1B is a cross-sectional view of a YZ plane taken along a broken line A-A' in FIG. 1A.

The antenna includes a first radiation element 101, a second radiation element 102, a ground 103, a dielectric member 104, i.e. dielectric substrate, and a power feed unit 105, and resonates between 3.1 gigahertz (GHz) and 10.6 GHz.

The first radiation element 101 and the second radiation element 102 are disposed on the dielectric member 104, and the ground 103 is disposed on the same YZ plane as the first radiation element 101 and the second radiation element 102. The power feed unit 105 is connected to the second radiation element 102, and a ground of the power feed unit 105 is connected to the ground 103.

The first radiation element 101 and the second radiation element 102 are in contact with each other at a first region 106 and a second region 107. With this configuration, the second radiation element 102 has a U-shaped element shape that is branched into two from the power feed unit 105 and has an empty region within the second radiation element 102.

The first radiation element 101 uses the second radiation element 102 as a power feed line and operates as a wideband elliptical monopole antenna. The second radiation element 102 operates like a wideband elliptical loop antenna through shared use of a part of the first radiation element 101.

A combination of the two different antenna operations allows the antenna to achieve ultra-wideband. Further, a substantially omnidirectional radiation characteristic is achieved at any frequency. This is an advantageous characteristic in so-called UWB tags having a function of position measurement or the like.

The above-described combination also increases design flexibility. In the first radiation element 101, the resonance frequency varies in accordance with lengths of a major axis and a minor axis of the elliptical shape. In the second radiation element 102, the characteristic impedance changes in accordance with the line width, and the resonance frequency changes in accordance with the shape which varies by an increase in the empty region within the U-shaped portion, for example. Since there are many design parameters, an antenna can be designed with a high degree of freedom in accordance with a substrate or a mounting housing.

Unless otherwise stated in the present exemplary embodiment, the dielectric member 104 is FR4-epoxy with a thickness of 1 millimeter (mm), the first radiation element 101 and the second radiation element 102 are conductors with a thickness of 35 micrometers (um), and the antenna is configured on a dielectric substrate. The first radiation element 101 is an elliptical element with a major axis of 11.5 mm in an X direction in FIG. 1A and a minor axis of 7.5 mm in a Y direction in FIG. 1A. The second radiation element 102 is a U-shaped element with a total length of 8 mm and a line width of 0.8 mm. A separation distance between the first radiation element 101 and the ground 103 is 2.5 mm.

The dimensions can be freely varied to obtain a target resonant frequency. For example, the separation distance between the first radiation element 101 and the ground 103 disposed along the same plane needs to be set to be shorter than a quarter wavelength of the lowest frequency (3.1 GHz in the present exemplary embodiment) at the resonant frequency bandwidth, to ensure that the antenna operates as a wideband elliptical monopole antenna. This is because the antenna achieves a wideband characteristic by electrical coupling between the first radiation element 101 and the ground 103. As for the lengths of the first region 106 and the second region 107, since the second radiation element 102 operates like an elliptical loop antenna through shared use of a part of the first radiation element 101, the length of each of the first region 106 and the second region 107 needs to be set to be shorter than a quarter wavelength of the lowest frequency (3.1 GHz in the present exemplary embodiment) at the resonance frequency bandwidth. This is because an increase in the total length of the first region 106 and the second region 107 leads to a deformation of the shared shape with the first radiation element 101, and as a result, the wideband characteristics of the elliptical loop antenna are lost, and the ultra-wideband characteristics of the antenna are lost. The lengths of the first region 106 and the second region 107 may be substantially the same as or different from each other. By varying the lengths of the first region 106 and the second region 107, a phase difference may be generated.

For example, the antenna may be designed to cause the first radiation element 101 to radiate circularly polarized waves by setting the phase difference based on the lengths of the first region 106 and the second region 107 to 90 degrees. However, if the phase difference between the two regions is 180 degrees, signals input from respective contact points cancel each other in the first radiation element 101, and the antenna does not operate. The phase difference between the respective contact points is adjustable by setting the lengths of the first region 106 and the second region 107 to values different from each other. While lines virtually connecting the contact points of the antenna illustrated in FIG. 1 and the ground 103 are substantially parallel to each other, the adjustment of the phase difference is achievable by moving one of the contact points to set the lines to be non-parallel.

With a design using the above parameters, an ultra-wideband antenna with a simple and compact configuration, and a high degree of freedom in design is realized.

FIGS. 2A to 2D are diagrams illustrating shape variation examples of the first radiation element 101 and the second radiation element 102 in the present exemplary embodiment. In the present exemplary embodiment, the first radiation element 101 is described as an elliptical patch type, and the second radiation element 102 is described as a U-shape type. However, the first radiation element 101 is not limited to the elliptical patch type and may be any shape as long as the shape is a planar shape capable of realizing wideband characteristics. Examples of such a shape include a polygonal shape illustrated in FIG. 2A, a rhombus illustrated in FIG. 2B, a conical shape, and a perfect circle. Similarly, the second radiation element 102 may be any linear shape as long as the second radiation element 102 is in contact with the first radiation element 101 in the first region 106 and the second region 107 with an empty region within it. Examples of such a shape include an angular U-shape illustrated in FIG. 2C or a trapezoidal shape illustrated in FIG. 2D. By using these shapes and designing to meet the above-described separation distance between the first radiation element 101 and the ground 103, and the above-described phase difference between the contact points of the first region 106 and the second region 107, an ultra-wideband antenna is realized.

Figure 3:
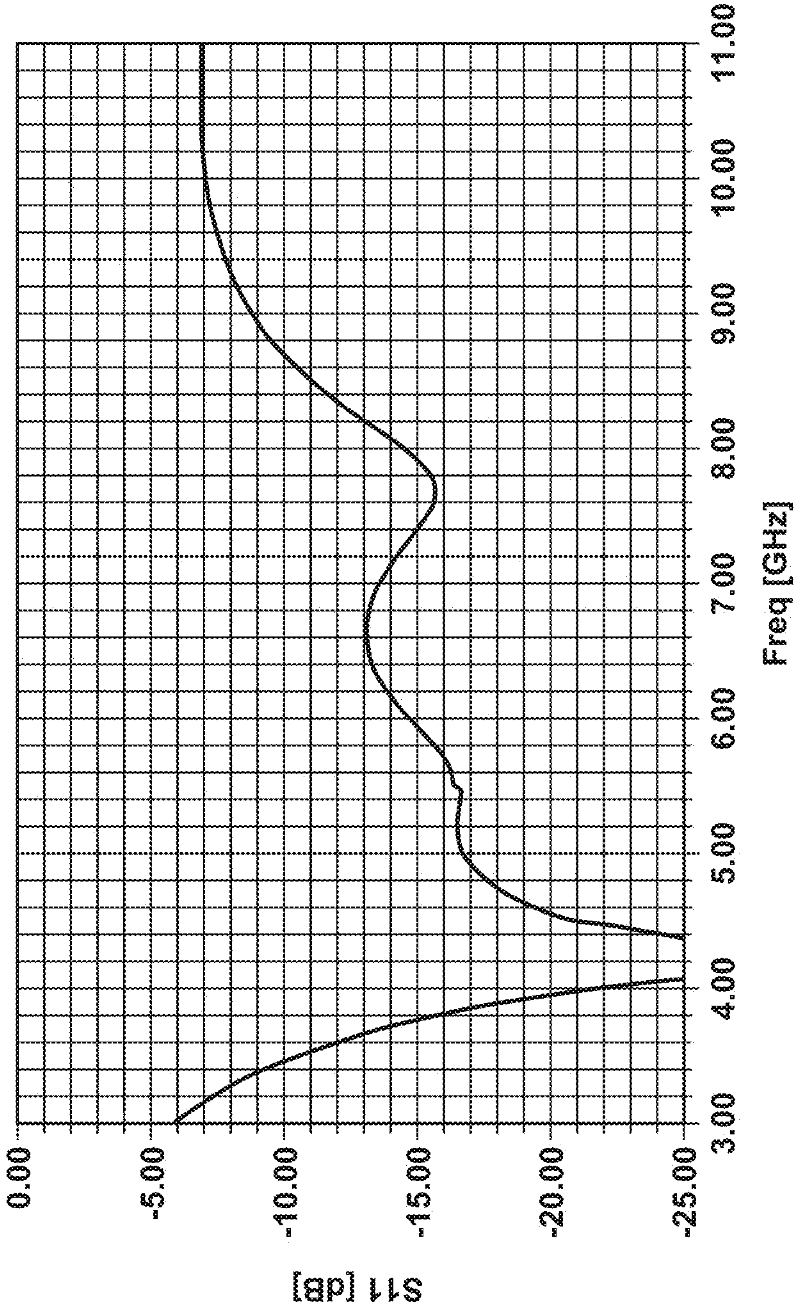
FIG. 3 is a diagram illustrating an electromagnetic field simulation result of the antenna according to the first exemplary embodiment.

FIG. 3 is a diagram illustrating an electromagnetic field simulation result of the antenna illustrated in FIG. 1. The vertical axis represents reflection characteristics S11 in units of decibel (dB). The horizontal axis represents frequency in units in GHz. The frequency band of UWB allocated by the Federal Communication Commission (FCC) is from 3.1 GHz to 10.6 GHz. Within the frequency band, S11 is less than or equal to −6 dB with the antenna according to the present exemplary embodiment. That is, within the wideband from 3.1 GHz to 10.6 GHz, 75% or more of the input power is received by the antenna without being reflected, which means that a highly efficient antenna is realized.

This characteristic confirms that the antenna is usable as an antenna compliant with the Institute of Electrical and Electronic Engineers (IEEE) 802.15.4z standard, for example.

Figure 4A:
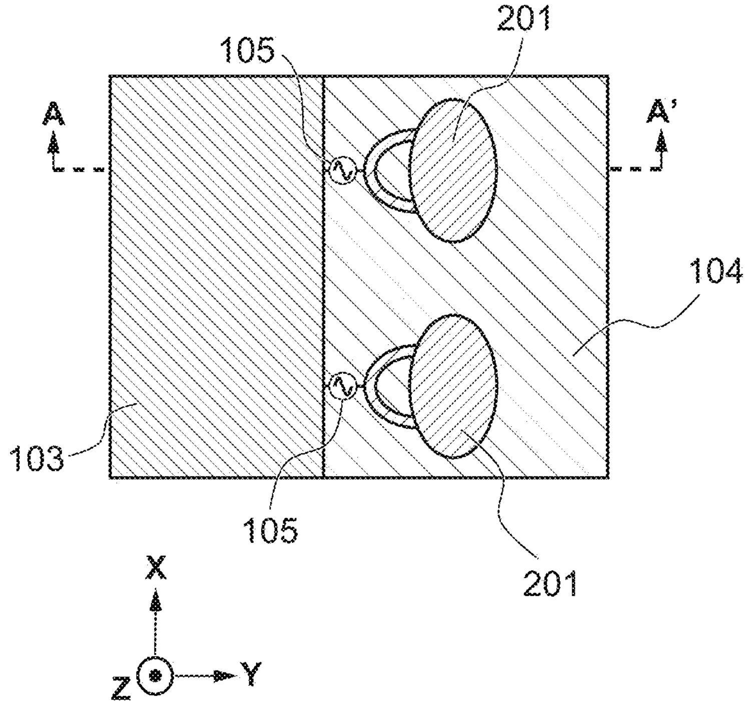
FIGS. 4A and 4B are diagrams illustrating an example of an antenna array according to the first exemplary embodiment.
Figure 4B:
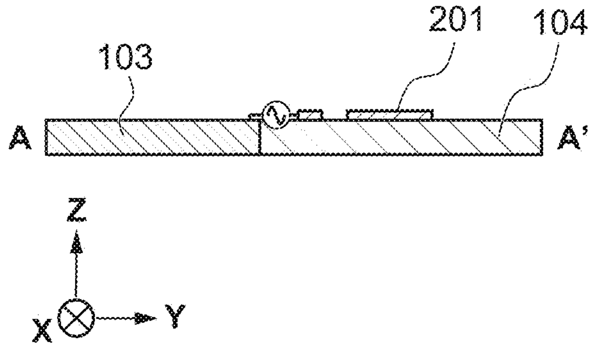

FIG. 4 is an example of an antenna array using the antennas according to the present exemplary embodiment.

The antenna array is configured with a plurality of antenna elements 201 according to the present exemplary embodiment arranged in a horizontal direction (X direction) and power feed units 105 each provided for a corresponding one of the antenna elements 201. While a signal is directly input to each of the antenna elements 201 from a corresponding one of the power feed units 105, as illustrated in FIG. 4, power feed lines may be configured to input signals to the respective antenna elements 201. In this case, the power feed lines are designed to be spaced apart from each other to prevent the radiation of the antenna from being affected. In a case where signals are input in-phase, the directivity in a front direction (Z direction) is enhanced. By applying a phase difference between signals to be input to the antenna elements 201, directivity in directions other than the front direction is also achievable.

A parameter in configuring an array is spacing between the antenna elements 201. In a case of in-phase power feeding in an array of omnidirectional antennas, the maximum directivity gain is achievable by setting an element interval of about more than or equal to 0.6 wavelength to less than or equal to 0.8 wavelength of the frequency (3.1 GHz to 10.6 GHz) at which the antennas operate. The element interval indicates a distance between the two power feed units 105 illustrated in FIG. 4. The antenna elements 201 according to the present exemplary embodiment may be used in an array to provide an effective antenna array, configured in the above-described manner.

In order to reduce a correlation coefficient between antennas, a configuration in which performance of the antenna array is improved by using a method of providing a slit in the ground 103, a method of changing the orientation of each of the antenna elements 201 to be arranged, or the like is also adaptable. Such antenna array is usable as an antenna of a distance and angle measurement system using UWB, such as a Time-of-Flight (ToF) system or an Angle of Arrival (AoA) system, for which a plurality of antennas are utilized.

Figure 5A:
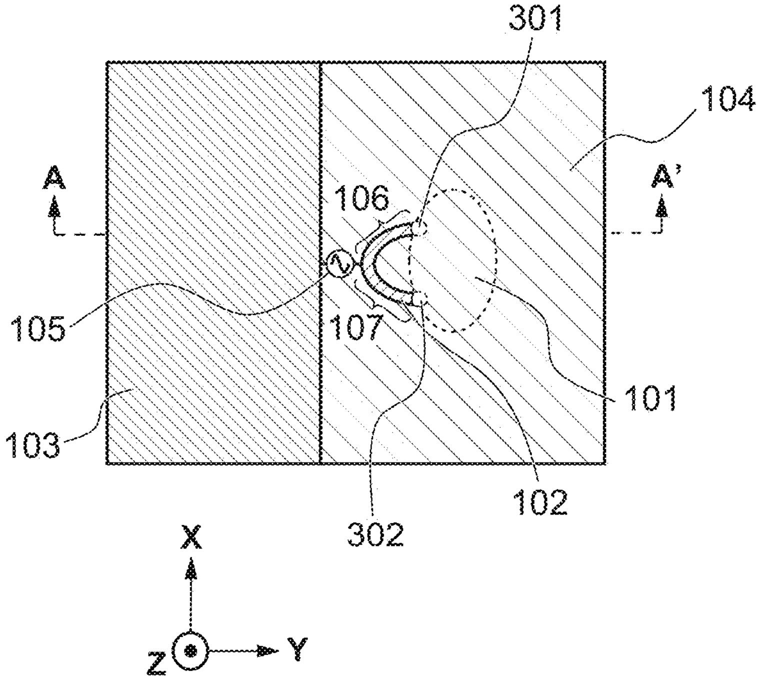
FIGS. 5A and 5B are diagrams illustrating an example of an overall configuration of an antenna according to a second exemplary embodiment.
Figure 5B:
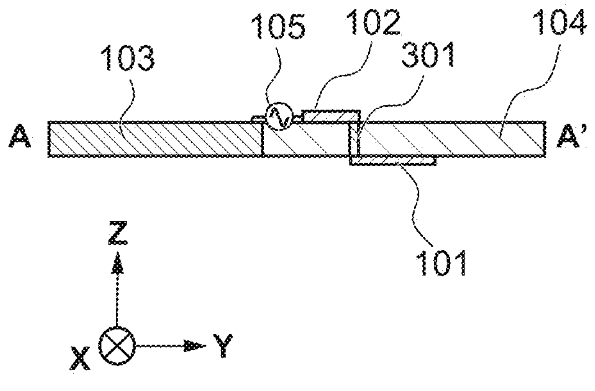

FIG. 5A and FIG. 5B are diagrams illustrating an overall configuration of an antenna according to a second exemplary embodiment. FIG. 5B is a cross-sectional view of a YZ plane taken along a broken line A-A' illustrated in FIG. 5A.

The antenna includes a first radiation element 101, a second radiation element 102, a ground 103, a dielectric member 104, and a power feed unit 105, and resonates between 3.1 GHz and 10.6 GHz. The first radiation element 101 is disposed on one surface of the dielectric member 104 and the ground 103 is disposed on an opposite surface of the dielectric member 104, along the same plane. The second radiation element 102 is disposed on the opposite surface of the dielectric member 104, i.e., on the surface that is opposite to the surface where the first radiation element 101 is disposed. The power feed unit 105 is connected to the second radiation element 102, and a ground of the power feed unit 105 is connected to the ground 103. The second radiation element 102 is connected to a first region 106 and a second region 107 by vias 301 and 302, and is connected to the first radiation element 101.

In the present exemplary embodiment, the first radiation element 101 and the second radiation element 102 are disposed on the opposite substrate surfaces of the dielectric member 104 and connected to each other by the vias 301 and 302. Even with this configuration, the antenna operates in the same manner as the antenna according to the first exemplary embodiment, and an ultra-wideband antenna is realized.

Unless otherwise stated in the present exemplary embodiment, the dielectric member 104 is FR4-epoxy with a thickness of 1 mm, the first radiation element 101 and the second radiation element 102 are conductors with a thickness of 35 um, and the antenna is configured on a dielectric substrate. The first radiation element 101 is an elliptical element with a major axis of 11.5 mm and a minor axis of 7.5 mm. The second radiation element 102 is a U-shaped element with a total length of 8 mm and a line width of 0.8 mm. A separation distance between the first radiation element 101 and the ground 103 is 2.5 mm. Each of the vias 301 and 302 is columnar in shape with a diameter of 0.8 mm and a height of 1 mm.

By connecting with the vias 301 and 302, an electrical length of the first region 106 and the second region 107 is longer than the electrical length in the first exemplary embodiment described above. Thus, in the present exemplary embodiment, even in a case where the first radiation element 101 and the second radiation element 102 have the same sizes as those of the first exemplary embodiment, the bandwidth on the lower frequency side of the resonance frequency is wider. As described above, since the resonance structure of an antenna mainly depends on the wavelength, an antenna size is increased to cover a wide frequency band. Thus, by increasing the electrical length of the first region 106 and the second region 107 by using the vias 301 and 302, antenna characteristics in a wider band are able to be realized with a smaller antenna area.

When the antenna is mounted on a housing, a metal component, a resin housing, a human body, or the like may be in proximity to the first radiation element 101. When these come close to the first radiation element 101, there is a concern about an influence on the antenna characteristics and an influence of electromagnetic waves on a human body. However, by arranging only the first radiation element 101 on the back surface of the dielectric member 104 by the vias 301 and 302, the first radiation element 101 is kept away from a metal component, resin, a human body, and the like. Therefore, in a case where the specific absorption rate (SAR) characteristics, the antenna characteristics, and the like are affected by these factors, improvement in the characteristics is expectable with the configuration according to the present exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of and priority to Japanese Patent Application No. 2024-100872, filed Jun. 21, 2024, the entirety of which is incorporated herein by reference.

What is claimed is:

1. An antenna configured to operate between a first frequency and a second frequency, the antenna comprising:

a first radiation element;

a second radiation element;

a ground; and a power feed unit, wherein the ground is disposed at least on a same plane as the first radiation element, wherein the first radiation element is a planar shape conductor including a first contact point and a second contact point that are in contact with the second radiation element, wherein the second radiation element is a linear shape conductor branching from the power feed unit with a first region extending from the first contact point to the power feed unit, and a second region extending from the power feed unit to the second contact point, wherein the first region and the second region are each shorter than a quarter wavelength of the first frequency, and wherein a separation distance between the ground and the first radiation element in the same plane is shorter than the quarter wavelength of the first frequency.

2. The antenna according to claim 1, wherein the first region and the second region have substantially a same length.

3. The antenna according to claim 1, wherein the first radiation element is elliptical shaped, view from a front direction.

4. The antenna according to claim 1, further comprising a dielectric substrate, wherein the ground and the first radiation element are provided as a first layer on the dielectric substrate.

5. The antenna according to claim 4, wherein the second radiation element and the power feed unit are provided on the dielectric substrate as a second layer, different from the first layer, and wherein at least a part of the first region or the second region includes a via penetrating the dielectric substrate.

6. The antenna according to claim 1, wherein a phase difference between lengths of the first region and the second region is 90 degrees.

7. The antenna according to claim 1, wherein the antenna is configured for use in Ultra-Wideband (UWB).

8. The antenna according to claim 1, wherein the first frequency is 3.1 gigahertz (GHz) and the second frequency is 10.6 GHz.

9. The antenna according to claim 1, wherein the antenna is configured to transmit or receive a signal compliant with an Institute of Electrical and Electronic Engineers (IEEE) 802.15.4z standard.

10. An antenna array configured to operate between a first frequency and a second frequency, the antenna array comprising:

a plurality of first radiation elements;

a plurality of second radiation elements; and a ground; and at least one power feed unit, wherein the ground is disposed at least on a same plane as the plurality of first radiation elements, wherein each first radiation element of the plurality of first radiation elements is a planar shape conductor including a first contact point and a second contact point that are in contact with a corresponding second radiation element of the plurality of second radiation elements, wherein each second radiation element of the plurality of second radiation elements is a linear shape conductor branching from the at least one power feed unit with a first region that extends from the first contact point to the at least one power feed unit, and a second region that extends from the at least one power feed unit to the second contact point, wherein the first region and the second region are each shorter than a quarter wavelength of the first frequency, and wherein a separation distance between the ground and each of the plurality of the first radiation elements in the same plane is shorter than the quarter wavelength of the first frequency.

11. The antenna array according to claim 10, further comprising a plurality of the power feed units, wherein a distance between the plurality of the power feed units is more than or equal to 0.6 wavelength and less than or equal to 0.8 wavelength of a frequency between the first frequency and the second frequency.

* * * * *